United States Patent
Wood et al.

(10) Patent No.: US 9,832,116 B2
(45) Date of Patent: Nov. 28, 2017

(54) ADJUSTING ENTRIES IN A FORWARDING INFORMATION BASE IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 80 days.

(21) Appl. No.: 15/069,628

(22) Filed: Mar. 14, 2016

(65) Prior Publication Data
US 2017/0264536 A1   Sep. 14, 2017

(51) Int. Cl.
*H04L 12/26* (2006.01)
*H04L 12/741* (2013.01)
*H04L 12/751* (2013.01)

(52) U.S. Cl.
CPC .......... *H04L 45/54* (2013.01); *H04L 43/0864* (2013.01); *H04L 45/02* (2013.01)

(58) Field of Classification Search
CPC .............................. H04L 45/54; H04L 67/327
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Kevin C Harper

(57) ABSTRACT

One embodiment provides a system that facilitates dynamic adjustment of forwarding information in a CCN. During operation, the system receives, by forwarding circuitry, an interest with a name that is a hierarchically structured variable length identifier which comprises contiguous name components ordered from a most general level to a most specific level. The system identifies in a first data structure an entry for one or more name components of the name, wherein the entry includes a list of outgoing interfaces associated with the one or more name components. The system determines network properties in response to forwarding the interest to a first interface of the list. The system reorders the list in order of priority based on the network properties, thereby facilitating the forwarding circuitry to dynamically adjust a likelihood of using a respective interface for forwarding interests associated with the one or more name components.

20 Claims, 6 Drawing Sheets

(56) References Cited

U.S. PATENT DOCUMENTS

| | | | |
|---|---|---|---|
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,173,364 B1 | 1/2001 | Zenchelsky |
| 6,226,618 B1 | 5/2001 | Downs |
| 6,233,617 B1 | 5/2001 | Rothwein |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,071,498 B2 | 6/2015 | Beser |
| 9,112,895 B1 | 8/2015 | Lin |
| 9,280,610 B2 | 3/2016 | Gruber |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0033394 A1 | 2/2003 | Stine |
| 2003/0046396 A1 | 3/2003 | Richter |
| 2003/0046421 A1 | 3/2003 | Horvitz |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |

(56) References Cited

U.S. PATENT DOCUMENTS

| | | |
|---|---|---|
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |

(56) References Cited

U.S. PATENT DOCUMENTS

| | | |
|---|---|---|
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219427 A1 | 9/2011 | Hito |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0066823 A1 | 3/2013 | Sweeney |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |

(56) References Cited

U.S. PATENT DOCUMENTS

| | | |
|---|---|---|
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0372903 A1 | 12/2015 | Hui |
| 2016/0021172 A1* | 1/2016 | Mahadevan ...... G06F 17/30598 709/204 |
| 2016/0044126 A1* | 2/2016 | Mahadevan ........ H04L 67/2842 709/213 |
| 2016/0072715 A1* | 3/2016 | Mahadevan ........ H04L 47/2466 370/236 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
Ao-Jan Su, David Fl Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library-Pairing-Based Cryptography-About," http://crypto.stanford.edu/pbc. downloaded Apr. 27, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
Gopal et al. "Integrating content-based Mechanisms with hierarchical File systems", Feb. 1999, University of Arizona, 15 pages.
Detti et al., "Supporting the Web with an information centric network that routes by name", Aug. 2012, Computer Networks 56, pp. 3705-3702.
Hoque et al., 'NLSR: Named-data Link State Routing Protocol', Aug. 12, 2013, ICN 2013, pp. 15-20.
V. Jacobson et al., 'Networking Named Content,' Proc. IEEE CoNEXT '09, Dec. 2009.
L. Wang et al., 'OSPFN: An OSPF Based Routing Protocol for Named Data Networking,' Technical Report NDN-0003, 2012.
Merindol et al., "An efficient algorithm to enable path diversity in link state routing networks", Jan. 10, Computer Networks 55 (2011), pp. 1132-1140.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Garcia-Luna-Aceves et al., "Automatic Routing Using Multiple Prefix Labels", 2012, IEEE, Ad Hoc and Sensor Networking Symposium.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
C. Gentry and A. Silverberg. Hierarchical ID-Based Cryptography. Advances in Cryptology—ASIACRYPT 2002. Springer Berlin Heidelberg (2002).
Xiong et al., "CloudSeal: End-to-End Content Protection in Cloud-based Storage and Delivery Services", 2012.
Biradar et al., "Review of multicast routing mechanisms in mobile ad hoc networks", Aug. 16, Journal of Network and Computer Applications 35 (2012) 221-229.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
J. Shao and Z. Cao. CCA-Secure Proxy Re-Encryption without Pairings. Public Key Cryptography. Springer Lecture Notes in Computer Sciencevol. 5443 (2009).
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

(56) References Cited

OTHER PUBLICATIONS

RTMP (2009). Available online at http://wwwimages.adobe.com/www.adobe.com/content/dam/Adobe/en/devnet/rtmp/ pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

Sandvine, Global Internet Phenomena Report—Spring 2012. Located online at http://www.sandvine.com/downloads/ documents/Phenomenal H 2012/Sandvine Global Internet Phenomena Report 1H 2012.pdf.

The Despotify Project (2012). Available online at http://despotify.sourceforge.net/.

V. K. Adhikari, S. Jain, Y. Chen, and Z.-L. Zhang. Vivisecting Youtube:An Active Measurement Study. In INFOCOM12 Miniconference (2012).

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

B. Ahlgren et al., 'A Survey of Information-centric Networking' IEEE Commun. Magazine, Jul. 2012, pp. 26-36.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

(56) References Cited

OTHER PUBLICATIONS

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/ optimizing.pdf (retrieved on Mar. 9, 2012).
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "Easier: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.

(56) References Cited

OTHER PUBLICATIONS

Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, O. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
D. Trossen and G. Parisis, "Designing and realizing and information-centric Internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Zahariadis, Theodore, et al. "Trust management in wireless sensor networks." European Transactions on Telecommunications 21.4 (2010): 386-395.
Mahadevan, Priya, et al. "Systematic topology analysis and generation using degree correlations." ACM SIGCOMM Computer Communication Review. vol. 36. No. 4. ACM, 2006.
https://code.google.com/p/ccnx-trace/.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.

\* cited by examiner

TABLE
200

| TIME 202 | ACTION 204 | PARTIAL FIB ENTRY 206 | LIST OF FACES 208 |
|---|---|---|---|
| T1 | Node 110 sends INT 130 via $P_0$ to Node 106 | $P_0$, RTT=null, IR=0, PT=0 | $\{P_0, P_1, P_2, P_3 ... P_i\}$ |
| T2 | Node 110 receives an IR via $P_0$, and sets IR=1 | $P_0$, RTT=null, IR=1, PT=0 | $\{P_0, P_1, P_2, P_3 ... P_i\}$ |
| T3 | Node 110 reorders the list (moves $P_0$ to end of list) | $P_0$, RTT=null, IR=1, PT=0 | $\{P_1, P_2, P_3 ... P_i, P_0\}$ |
| T4 | Node 110 sends INT 130 via $P_1$ to Node 108 | $P_1$, RTT=null, IR=0, PT=0 | $\{P_1, P_2, P_3 ... P_i, P_0\}$ |
| T5 | Node 110 receives a CO via $P_1$, and sets RTT=10 | $P_1$, RTT=10, IR=0, PT=0 | $\{P_1, P_2, P_3 ... P_i, P_0\}$ |
| T6 | Node 110 reorders the list (no change to list) | $P_1$, RTT=10, IR=0, PT=0 | $\{P_1, P_2, P_3 ... P_i, P_0\}$ |
| T7 | Node 110 sends INT 130 via $P_2$ to Node 114 | $P_2$, RTT=null, IR=0, PT=0 | $\{P_1, P_2, P_3 ... P_i, P_0\}$ |
| T8 | Node 110 receives a CO via $P_2$, and sets RTT=5 | $P_2$, RTT=5, IR=0, PT=0 | $\{P_1, P_2, P_3 ... P_i, P_0\}$ |
| T9 | Node 110 reorders the list (moves $P_2$ before $P_1$) | $P_2$, RTT=5, IR=0, PT=0 | $\{P_2, P_1, P_3 ... P_i, P_0\}$ |
| T10 | Node 110 sends INT 130 via $P_3$ to Node 112 | $P_3$, RTT=null, IR=0, PT=0 | $\{P_1, P_2, P_3 ... P_i, P_0\}$ |
| T11 | Node 110 detects timeout of PIT entry for INT 130 sent via $P_3$ | $P_3$, RTT=null, IR=0, PT=1 | $\{P_1, P_2, P_3 ... P_i, P_0\}$ |
| T12 | Node 110 reorders the list (moves $P_3$ to end of list) | $P_3$, RTT=null, IR=0, PT=1 | $\{P_2, P_1, ... P_i, P_0, P_3\}$ |

FIG. 2

ADJUSTING ENTRIES IN A FORWARDING INFORMATION BASE IN A CONTENT CENTRIC NETWORK

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/864,571, entitled "SYSTEM AND METHOD FOR ELIMINATING UNDETECTED INTEREST LOOPING IN INFORMATION-CENTRIC NETWORKS," by inventor Jose J. Garcia-Luna-Aceves, filed 24 Sep. 2015 (hereinafter "U.S. patent application Ser. No. 14/864,571");

the disclosures of which are herein incorporated by reference in their entirety.

BACKGROUND

Field

This disclosure is generally related to distribution of digital content. More specifically, this disclosure is related to a method and system for adjusting entries in a forwarding information base in a content centric network.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. A CCN forwarder (e.g., an intermediate node or a router) can receive and forward interests and content objects based on their names. The forwarder can implement a local forwarding strategy based on three data structures: a pending interest table (PIT), which records all interests that the router has forwarded but not yet satisfied; a forwarding information base (FIB), which is a routing table that maps name prefixes to outgoing interfaces; and a content store (CS), which is a temporary cache of data packets received by the forwarder.

The FIB can be populated by a name-prefix based routing protocol, and a FIB entry may include a list of multiple outgoing interfaces for a name prefix. Given an interest with a name prefix that has multiple outgoing interfaces in the corresponding FIB entry, the forwarder can determine how to forward the interest. For example, the forwarder may forward the interest to the interfaces in sequence, by forwarding the interest to the first listed interface and waiting for a response. If the forwarder receives an interest return message (indicating an upstream error or failure), or a timeout occurs, the forwarder may forward the interest to the next listed outgoing interface. However, this sequential or "serial" strategy (similar to a depth-first network traversal) may lead to inefficiencies in the network. The forwarder may instead forward the interest as a multicast message, by forwarding the interest in parallel to all listed interfaces. However, this may introduce additional and unnecessary traffic in the network, which may also lead to inefficiencies in the network.

While a CCN brings many desired features to a network, some issues remain unsolved for a forwarder in determining a forwarding strategy for forwarding interests with multiple outgoing interfaces listed in the FIB.

SUMMARY

One embodiment provides a system that facilitates dynamic adjustment of forwarding information in a CCN. During operation, the system receives, by forwarding circuitry, an interest with a name that is a hierarchically structured variable length identifier which comprises contiguous name components ordered from a most general level to a most specific level. The system identifies in a first data structure an entry for one or more name components of the name, wherein the entry includes a list of outgoing interfaces associated with the one or more name components. The system determines network properties in response to forwarding the interest to a first interface of the list of outgoing interfaces. The system reorders the list of outgoing interfaces in order of priority based on the network properties, thereby facilitating the forwarding circuitry to dynamically adjust a likelihood of using a respective interface for forwarding interests associated with the one or more name components.

In some embodiments, the system selects a second interface from the reordered list and forwards the interest to the second interface.

In some embodiments, the system records a round trip time that begins when the interest is forwarded to the first interface and ends when a responsive content object is received from the first interface. The system reorders the list to indicate that a higher priority is based on a shorter round trip time for a respective interface.

In some embodiments, the system receives from the first interface an interest return message which indicates an error condition. The system reorders the list to indicate that the first interface is of a lower priority than a second interface which has a recorded round trip time, wherein a round trip time begins when the interest is forwarded to the second interface and ends when a responsive content object is received from the second interface.

In some embodiments, the first data structure is a forwarding information base, and an entry in the forwarding information base further includes, for a respective interface of the list of outgoing interfaces, one or more of: an indicator of a round trip time that begins when the interest is forwarded to the first interface and ends when a responsive content object is received from the first interface; an indicator of receipt of an interest return message which indicates an error condition; and an indicator of a timeout of an entry in a pending interest table, wherein the timeout indicates that a responsive content object to the interest has not been received before an expiration of the entry.

In some embodiments, the one or more name components comprise a name prefix, and the one or more name components are contiguous name components beginning from the most general level.

In some embodiments, the system, in response to detecting in a second data structure a timeout of an entry for the interest after forwarding the interest to the first interface, removes the first interface from the list or reorders the first interface to a lowest priority in the list.

In some embodiments, the second data structure is a pending interest table, and an entry in the pending interest table includes the interest name, a list of incoming interfaces from which the interest is received, a list of outgoing interfaces to which the interest is forwarded, and an expiry time which indicates a lifetime for the entry in the pending interest table.

In some embodiments, the system calculates a weight for each outgoing interface based on the network properties. The system reorders the list to indicate that a higher priority is based on a greater calculated weight for a respective interface.

In some embodiments, the system performs a function based on network properties determined over a period of time, wherein the period of time is a predetermined value or a user-defined value.

BRIEF DESCRIPTION OF THE FIGURES

FIG. 2 illustrates an exemplary table of communication in a system which facilitates dynamically adjusting forwarding information in a content centric network, in accordance with an embodiment of the present invention.

In the figures, like reference numerals refer to the same figure elements.

DETAILED DESCRIPTION

Figure 1A:
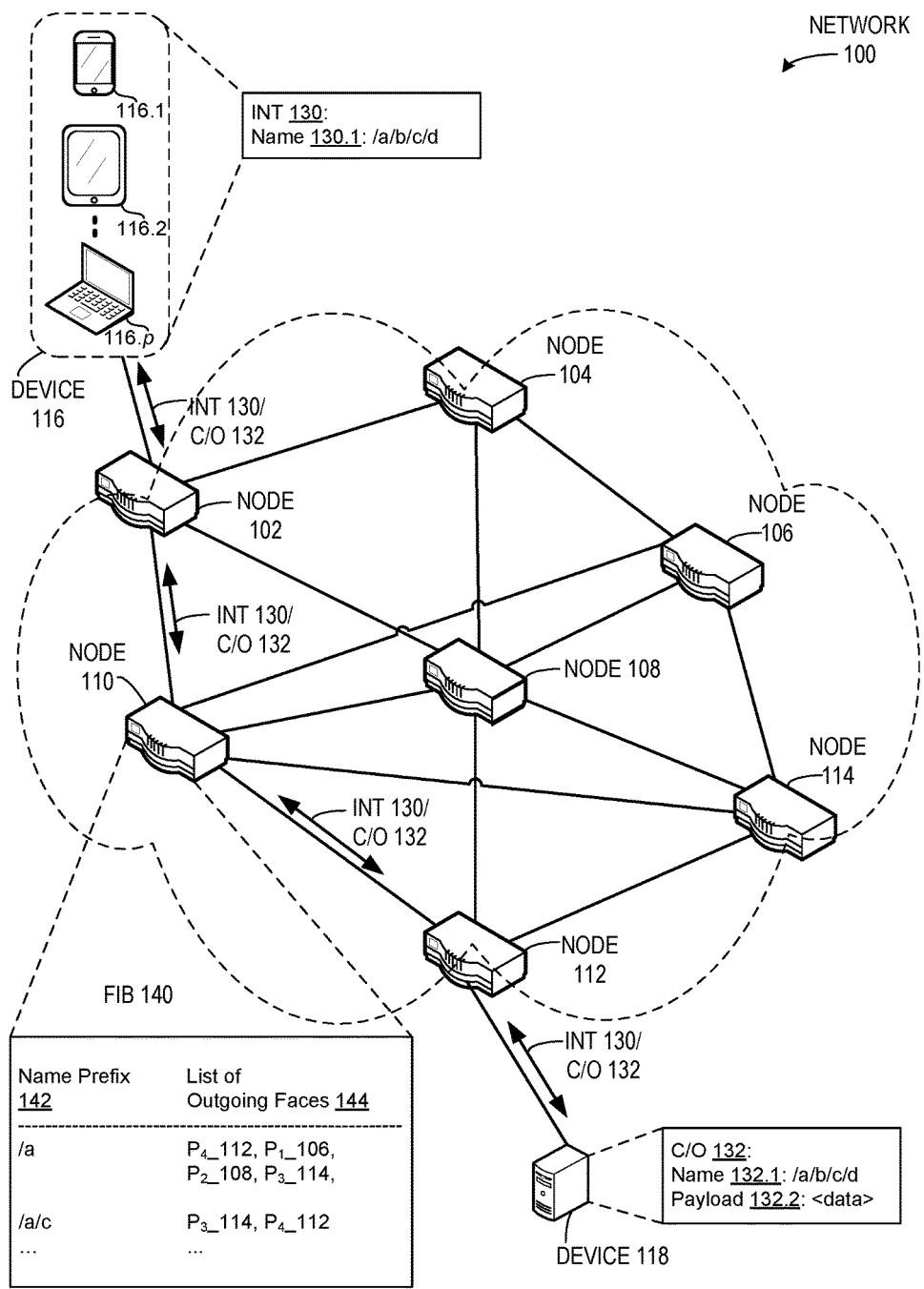
FIG. 1A illustrates an exemplary computing network that facilitates dynamically adjusting forwarding information in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of determining an efficient forwarding strategy by providing a system that allows a forwarder to dynamically adjust FIB entries based on network feedback. A FIB entry corresponds to a name prefix of an interest name, and can include a list of one or more outgoing interfaces which specify a next hop neighbor through which the forwarder can forward the interest to a destination node that can return responsive content. In the case of multiple outgoing interfaces, the forwarder can determine how to forward the interest. For example, the forwarder can use a sequential forwarding method by forwarding the interest to the first listed interface and waiting for a response. If the forwarder receives an error message, or a timeout occurs, the forwarder can forward the interest to the next listed interface. However, this sequential or serial method (which is similar to a depth-first traversal of the network) may lead to network inefficiencies. In another example, the forwarder may forward the interest simultaneously to all listed outgoing interfaces. However, this multicast or parallel method may also lead to network inefficiencies.

Embodiments of the present invention address these inefficiencies by allowing the forwarder to observe network properties in response to sending an interest via a given outgoing interface, and to use the network properties to adjust the order or priority of the list of outgoing interfaces. The forwarder can observe network properties such as a round trip time to transmit the interest and receive a corresponding content object via the given interface. The forwarder can also observe network properties such as receiving an interest return message that indicates an error condition (e.g., at an upstream node). The forwarder can also determine a timeout of a PIT entry based on an interest sent to the given outgoing interface.

The forwarder can record these network properties in the FIB entry, and reorder the list of outgoing interfaces based on the priorities. For example, given a sequential processing of ports numbered $P_1$-$P_i$, if a first interest sent to port $P_1$ returns an interest return message, and a second interest sent to port $P_2$ returns a responsive content object with a round trip time of 10 milliseconds, the forwarder can reorder the list so that $P_2$ has a higher priority than $P_1$. If a third interest sent to port $P_3$ returns a responsive content object with a round trip time of 5 milliseconds, the forwarder can reorder the list so that $P_3$ has a higher priority than both $P_1$ and $P_2$. If a fourth interest sent to port $P_4$ results in a timeout of a corresponding PIT entry, the forwarder can either remove $P_4$ from the list or move $P_4$ to the end of the list. Thus, the forwarder can dynamically adjust forwarding information included in a FIB entry by using observed network properties to prioritize and reorder the list of outgoing interfaces. The system facilitates the forwarder to dynamically adjust a likelihood of using a respective interface for forwarding interests associated with a given name prefix as listed in the FIB. The forwarder can also adjust a FIB entry based on a hop count to the nearest anchor (e.g., a node that can satisfy the interest) for a respective outgoing interface, which eliminates undetected interest looping, as described in U.S. patent application Ser. No. 14/864,571.

In CCN and in examples described in this disclosure, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms are used to describe the CCN architecture:

Content Object or "Content Object":

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest or "Interest":

A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

Face or "Face":

In CCN, the term face is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the terms "neighbor" and "interface" are interchangeable with the term "face," referring to an incoming or outgoing interface of an Interest.

The methods disclosed herein are not limited to CCN networks and are applicable to other architectures as well. A description of a CCN architecture is described in U.S. patent application Ser. No. 12/338,175 which is herein incorporated by reference.

Exemplary Computing Network

FIG. 1A illustrates an exemplary computing network 100 that facilitates dynamically adjusting forwarding information in a content centric network, in accordance with an embodiment of the present invention. A network 100 can include a consumer or client computing device 116, a producer or content producing device 118, and a router or other forwarding device at nodes 102, 104, 106, 108, 110, 112, and 114. Content requesting device 116 can include a smartphone 116.1, a tablet computer 116.2, and/or a personal computing device 116.p (e.g., a laptop). A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Network 100 can be a content centric network. A router can maintain a forwarding information base (FIB) and a pending interest table (PIT).

During operation, consumer or client computing device 116 can generate an interest 130 with a name 130.1 of "/a/b/c/d." Interest 130 can travel through network 100 via nodes 102, 110, and 112 before reaching producer or content producing device 118. Node 110 can be a router or a forwarding device, and can maintain a FIB 140 with entries that include a name prefix 142 and a list of outgoing faces 144. For example, FIB 140 can include an entry for name prefix "/a" with a list of outgoing faces that includes information corresponding to each of nodes 112, 106, 108, and 114 (e.g., respectively, $P_4\_112$, $P_1\_106$, $P_2\_108$, and $P_3\_114$). The information included in the list of outgoing faces can also correspond to a port on node 110 through which an interest can be forwarded to a next hop neighbor. FIB 140 can also include an entry for name prefix "/a/c" with a list of outgoing faces that includes information corresponding to each of nodes 114 and 112 (e.g., $P_3\_114$ and $P_4\_112$). As mentioned above, the FIB can be populated by a name-prefix based routing protocol, and the forwarder may use a sequential (serial) or a simultaneous multicast (parallel) method to forward an interest based on the list of outgoing faces in the corresponding FIB entry. Based on the sequential method, node 110 can forward interest 130 to node 112 via the corresponding face (e.g., $P_4\_112$). Interest 130 can reach device 118 via node 112, and device 118 can return a responsive content object 132 with a matching name 132.1 of "/a/b/c/d" and a payload 132.2 of "<data>," which travels back to device 116 on a reverse path as interest 130. Node 110 can observe various network properties based on sending interest 130 and receiving content object 132 via the $P_4\_112$ face, and node 110 can subsequently reorder the list of outgoing faces for the FIB entry corresponding to name prefix "/a."

Figure 1B:
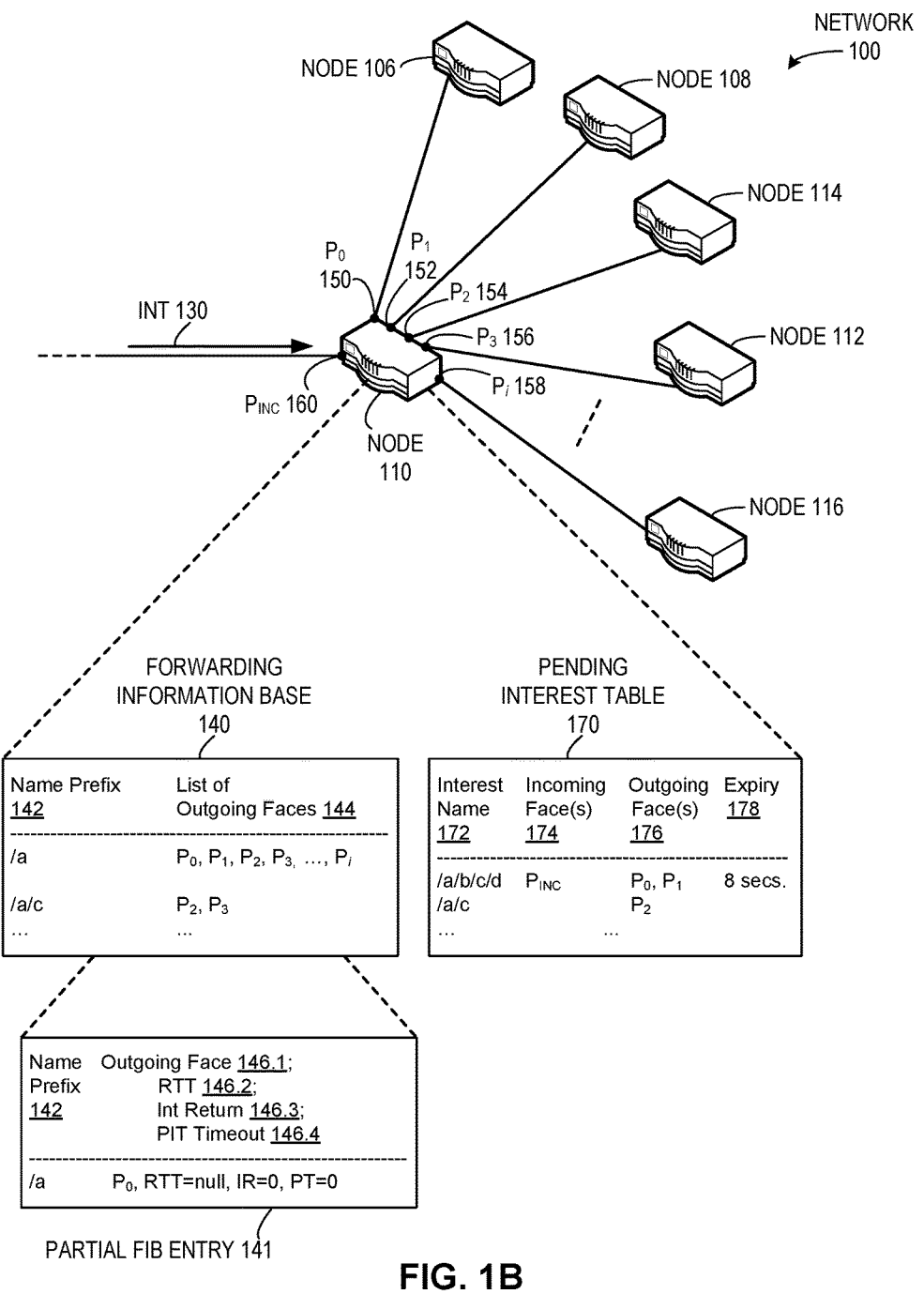
FIG. 1B illustrates an exemplary computing network that facilitates dynamically adjusting forwarding information in a content centric network, in accordance with an embodiment of the present invention.

FIG. 1B illustrates an exemplary computing network 150 that facilitates dynamically adjusting forwarding information in a content centric network, in accordance with an embodiment of the present invention. FIG. 1B corresponds to FIG. 1A and lists additional elements that illustrate embodiments of the present invention. In network 150 of FIG. 1B, node 110 is the intermediate node, router, or forwarding device that receives interest 130 from a downstream node. Node 110 maintains FIB 140 and a pending interest table (PIT) 170. FIB 140 includes entries that include a name prefix 142 and a list of outgoing faces 144. An entry for the name prefix "/a" can include a list of outgoing faces $P_0$-$P_i$, which correspond to the ports or faces depicted in FIG. 1B. For example, $P_0$ 150 is the port or face that corresponds to next hop neighbor node 106, $P_1$ 152 corresponds to node 108, $P_2$ 154 corresponds to node 114, $P_3$ 156 corresponds to node 112, and $P_i$ 158 corresponds to node 116 (not depicted in FIG. 1A).

A partial FIB entry 141 for name prefix "/a" can correspond to one outgoing face from the list of outgoing faces and can include the following: an outgoing face 146.1; a round trip time (RTT) 146.2 that indicates an amount of time that begins when the interest is forwarded to outgoing face 146.1 and ends when a responsive content object is received from outgoing face 146.1; an interest return 146.3 indicator which indicates an error condition or a failure at an upstream node; and a PIT timeout 146.4 indicator which indicates that a responsive content object to the interest has not been received before an expiration of the corresponding PIT entry. For example, partial FIB entry 141 indicates, for name prefix "/a," information for a face of the list of outgoing faces, including: the outgoing face $P_0$; an RTT with a default value of "null"; an interest return (IR) indicator with a default value of "0"; and a PIT entry timeout (PT) indicator with a default value of "0." Default values indicate that no network properties have been determined for the respective face. In some embodiments, the interest return message can indicate additional network information, such as congestion, jitter, and a packet loss rate associated with upstream routers.

PIT 170 can include entries with an interest name 172, a list of incoming faces 174, a list of outgoing faces 176, and an expiry time 178. For example, an entry for the interest name "/a/b/c/d" can include: an incoming face $P_{INC}$ (e.g., $P_{INC}$ 160), which corresponds to a previous hop neighbor from which interest 130 is received (e.g., node 102 as shown in FIG. 1A); outgoing faces $P_0$ and $P_1$, which correspond to the next hop neighbors to which interest 130 is forwarded; and an expiry time with a value of "8 seconds." The expiry time may be expressed in a relative time (such as 8 seconds) or an absolute time (such as 9:10:00:00:08 p.m. GMT). Note that the dashed lines appearing between nodes 112 and 116 indicate additional nodes (not pictured) which may be other next hop neighbors of node 110 and whose corresponding faces may also be included in the list of outgoing faces 144.

Exemplary Communication

FIG. 2 illustrates an exemplary table of communication in a system which facilitates dynamically adjusting forwarding information in a content centric network, in accordance with an embodiment of the present invention. The communication depicted in table 200 corresponds to the system of FIG. 1B. Table 200 includes entries with the following fields: a time 202; an action 204; a partial FIB entry 206 which corresponds to the outgoing face or port to which an interest is sent; and a list of faces 208 which includes the list of outgoing faces for the FIB entry, including the face corresponding to partial FIB entry 206. The list of faces 208 may be dynamically adjusted based on action 204 and changes to partial FIB entry 206.

During operation, at time T1, node 110 sends interest 130 via $P_0$ to node 106, where the fields of the partial FIB entry for $P_0$ include default values, and the list of faces is ordered as: $\{P_0, P_1, P_2, P_3, \ldots, P_i\}$. At time T2, node 110 receives an interest return message via $P_0$ and sets the interest return indicator to a value of "1" to indicate the receipt of the interest return message. At time T3, node 110 reorders the list of faces and moves $P_0$ to the end of the list: $\{P_1, P_2, P_3, \ldots, P_i, P_0\}$. Next, at time T4, node 110 sends interest 130 via $P_1$ to node 108, where the fields of the partial FIB entry for $P_1$ include default values, and the list of faces remains as reordered at time T3. At time T5, node 110 receives a content object via $P_1$, and determines and sets the RTT to a value of 10 milliseconds. At time T6, node 110 determines whether it needs to reorder the list, and makes no change to the list. The list of faces remains as reordered at time T3.

At time T7, node 110 sends interest 130 via $P_2$ to node 114, where the fields of the partial FIB entry for $P_2$ include default values, and the list of faces remains as reordered at time T3. At time T8, node 110 receives a content object via $P_2$, and determines and sets the RTT to a value of 5 milliseconds. At time T9, node 110 reorders the list of faces and moves $P_2$ before $P_1$ in the list: $\{P_2, P_1, P_3, \ldots, P_i, P_0\}$. At time T10, node 110 sends interest 130 via $P_3$ to node 112, where the fields of the partial FIB entry for $P_3$ include default values, and the list of faces remains as reordered at time T9. At time T11, node 110 detects a timeout of the corresponding PIT entry for interest 130 forwarded via $P_3$, and sets the PIT timeout ("PT") indicator to a value of "1" to indicate a timeout of the corresponding PIT entry. At time T12, node 110 reorders the list of faces and moves $P_3$ to the end of the list: $\{P_2, P_1, \ldots, P_i, P_0, P_3\}$. Node 110 can also remove $P_3$ from the list: $\{P_2, P_1, \ldots, P_i, P_0\}$ (not shown in FIG. 2).

Thus, a forwarding device (e.g., a router or other intermediate node) can observe network properties and make adjustments to the priority of outgoing faces listed in the FIB. As depicted above, a PIT timeout will result in the lowest priority (or removal from the list), an interest return message will result in a lower priority than a responsive content object with a RTT, and a longer RTT will result in a lower priority than a shorter RTT. The forwarding device can also use additional network properties included in the interest return message to adjust the priority of the outgoing faces listed in the FIB.

Role of Forwarding Device in Facilitating Dynamic FIB Adjustments

Figure 3:
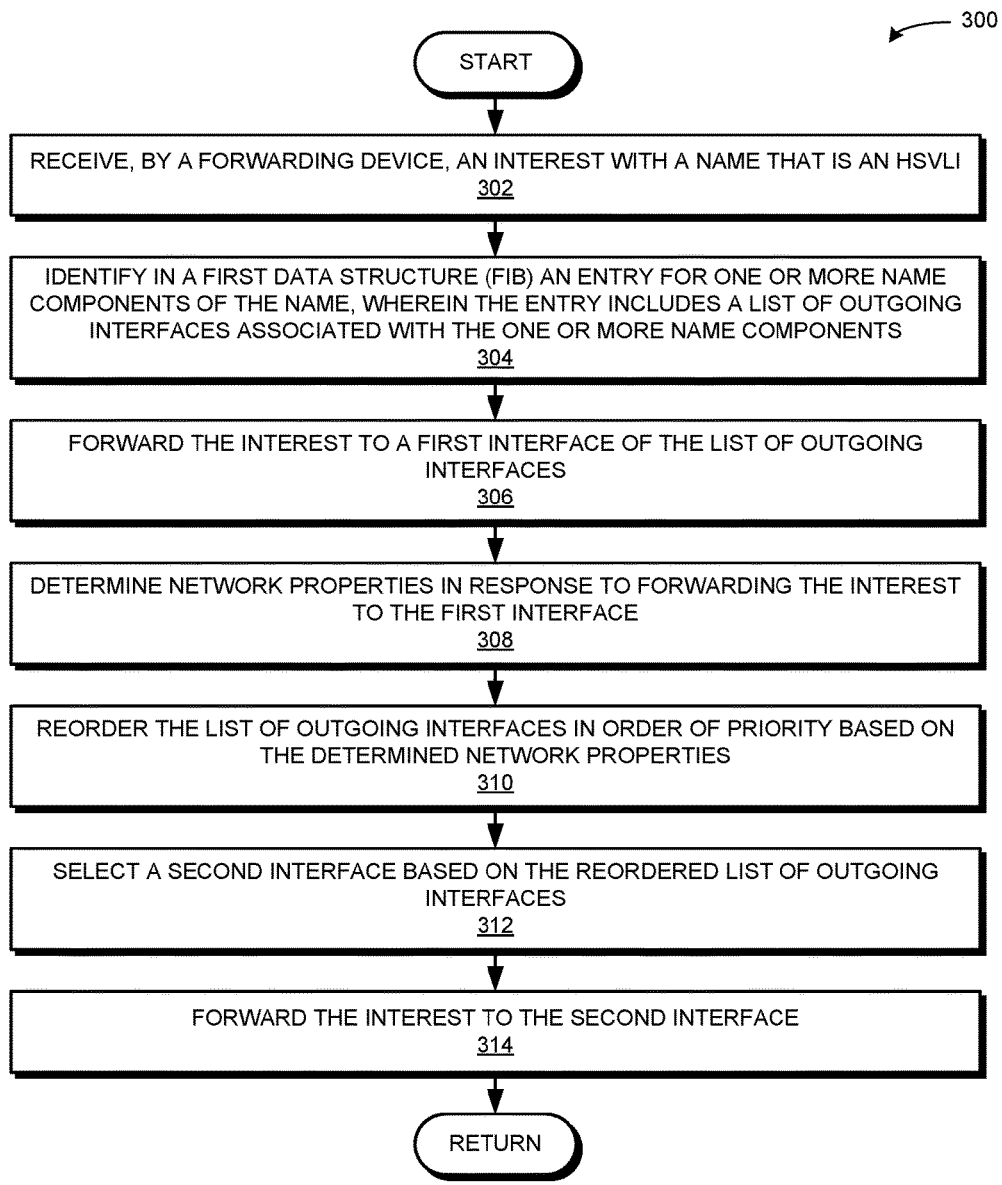
FIG. 3 presents a flow chart illustrating a method performed by a forwarding device for dynamically adjusting forwarding information in a content centric network, in accordance with an embodiment of the present invention.

FIG. 3 presents a flow chart 300 illustrating a method performed by a forwarding device for dynamically adjusting forwarding information in a content centric network, in accordance with an embodiment of the present invention. During operation, the system receives, by a forwarding device (or forwarding circuitry), an interest with a name that is an HSVLI which comprises contiguous name components ordered from a most general level to a most specific level (operation 302). The system identifies in a first data structure an entry for one or more name components of the name, wherein the entry includes a list of outgoing interfaces associated with the one or more name components (operation 304). The one or more name components can comprise a name prefix, and can be contiguous name components of the interest name beginning from the most general level, or can be any contiguous name components of the interest name. The first data structure can be a forwarding information base (FIB). The system forwards the interest to a first interface of the list of outgoing interfaces (operation 306). The system determines network properties in response to forwarding the interest to the first interface (operation 308). The system then reorders the list of outgoing interfaces in order of priority based on the network properties, thereby facilitating the forwarding device (or forwarding circuitry) to dynamically adjust a likelihood of using a respective interface for forwarding interests associated with the one or more name components (operation 310).

Subsequently, the system selects a second interface based on the reordered list of outgoing interfaces (operation 312), and forwards the interest to the second interface (operation 314). Given a list of outgoing interfaces, $P_0$-$P_i$, based on a serial or sequential method, the system can keep track of which interface is the current interface and which is the "next" interface. The system can resolve ambiguities in determining the next interface based on both the network properties previously collected for interfaces as well as the interfaces for which no network data has been collected. The system can also simultaneously send the interest to two or more interfaces of the list of interfaces based on the collected network properties, or use any method or strategy to forward the interest based on the collected network properties.

Figure 4:
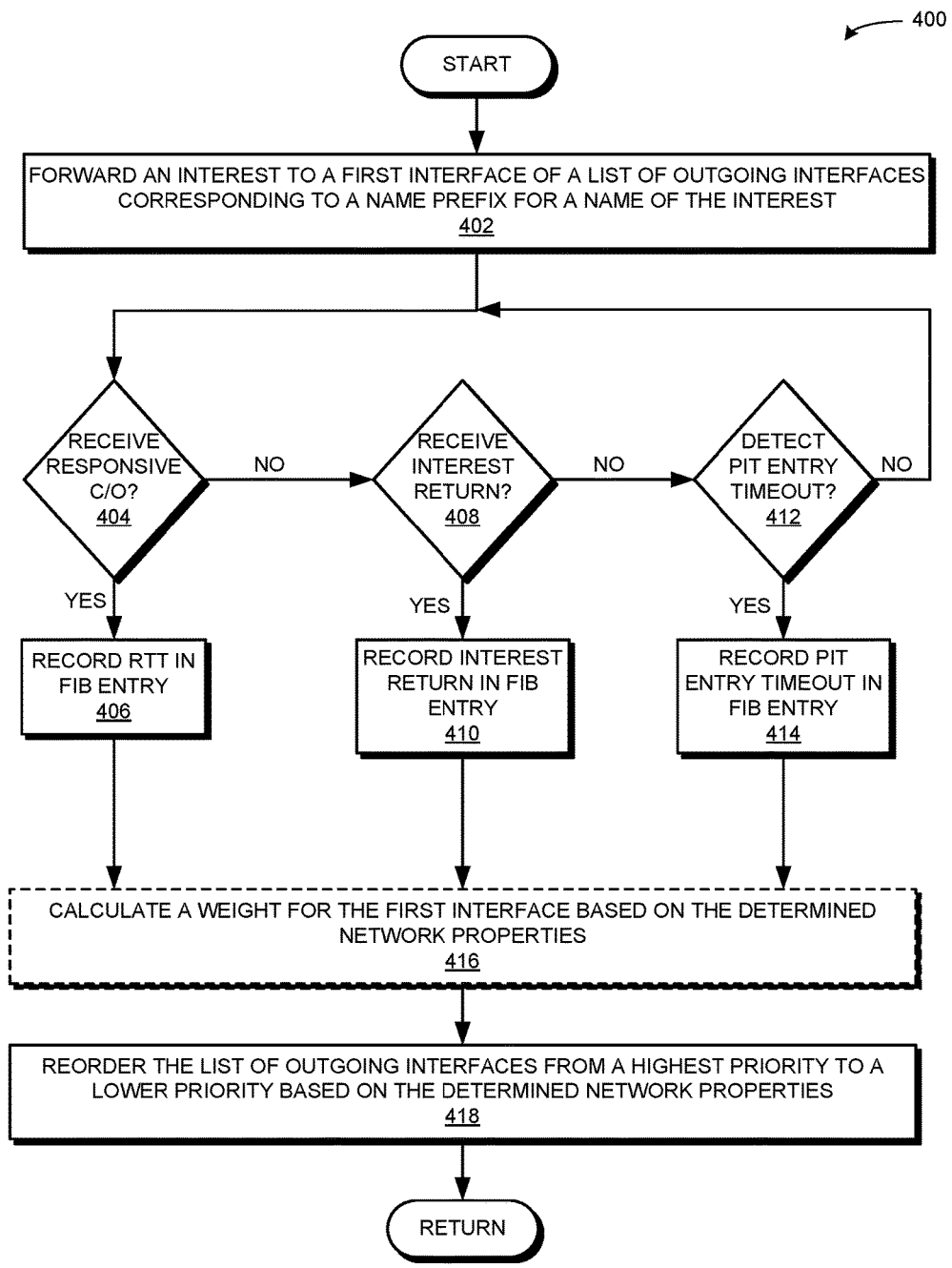
FIG. 4 presents a flow chart illustrating a method performed by a forwarding device for determining network properties and dynamically adjusting forwarding information in a content centric network, in accordance with an embodiment of the present invention.

FIG. 4 presents a flow chart 400 illustrating a method performed by a forwarding device for determining network properties and dynamically adjusting forwarding information in a content centric network, in accordance with an embodiment of the present invention. During operation, the system forwards, by a forwarding device (or forwarding circuitry), an interest to a first interface of a list of outgoing interfaces corresponding to one or more name components of the interest name (operation 402). The system determines whether it receives a responsive content object (decision 404). If it does, the system records the round trip time of the interest/content object exchange in the FIB entry that corresponds to the first interface (operation 406). If the system does not receive a responsive content object (decision 404), the system determines whether it receives an interest return message (decision 408). If it does, the system records the interest return in the corresponding FIB entry for the first interface (operation 410). If the system does not receives an interest return message (decision 408), the system determines whether it detects a timeout of the PIT entry corresponding to the interest forwarded to the first interface (decision 412). If it does, the system records the PIT entry timeout in the corresponding FIB entry for the first interface (operation 414). If the system does not detect a PIT entry timeout, the operation returns to decision 404.

Upon recording the RTT, the interest return, or the PIT entry timeout in the corresponding FIB entry for the first interface, the system may optionally calculate a weight for the first interface based on the determined network properties (operation 416). The forwarding device may compute a weight for the first interface based on a window of past observations, i.e., based on network properties observed over a period of time. For example, the forwarding device may track and compute average RTTs for two outgoing interfaces, and assign a greater weight to the interface with the greater average RTT over a period which includes the past 5 minutes.

Subsequently, the system reorders the list of outgoing interfaces in order of priority based on the determined network properties (operation 418). For example, a PIT timeout will result in the lowest priority (or removal from the list), an interest return message will result in a lower priority than a responsive content object with a RTT, and a longer RTT will result in a lower priority than a shorter RTT.

Exemplary Computer and Communication System

Figure 5:
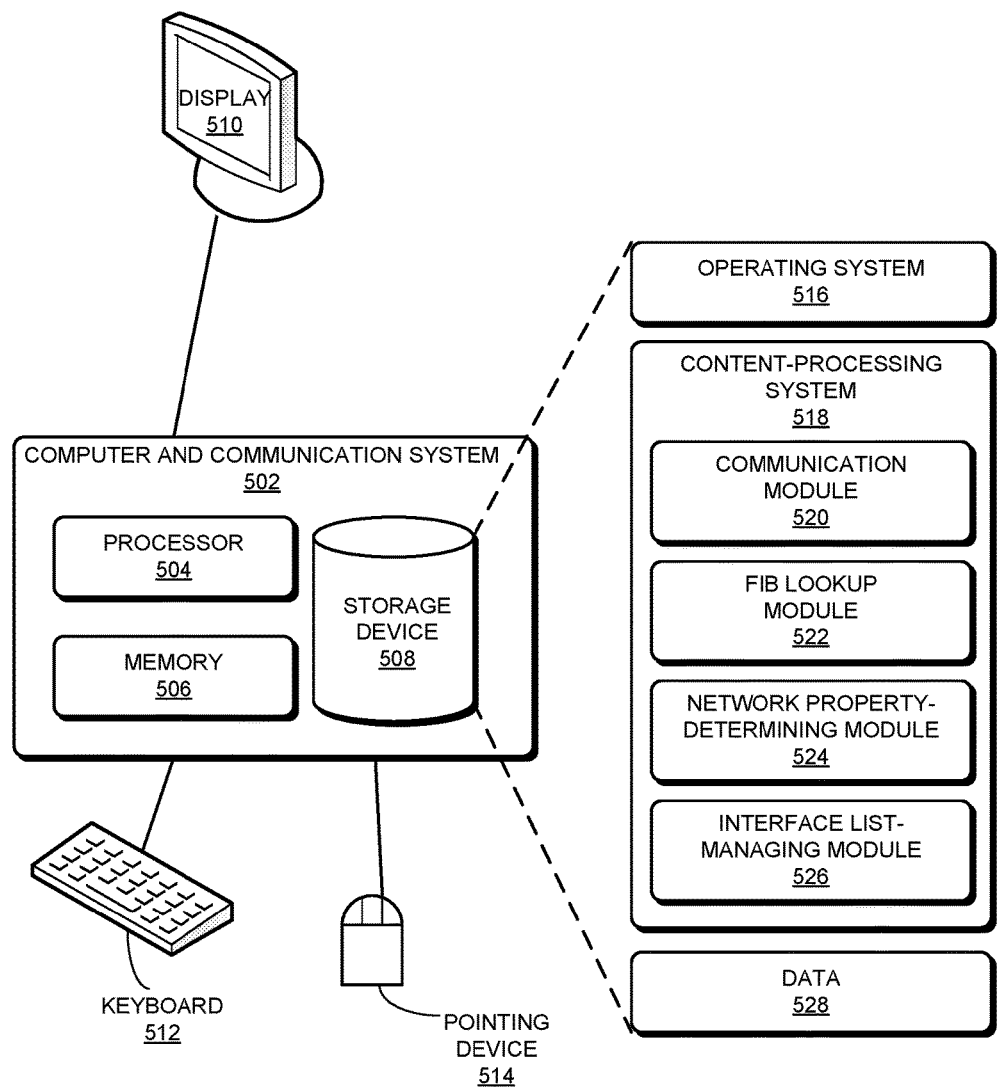
FIG. 5 illustrates an exemplary computer and communication system that facilitates dynamically adjusting forwarding information in a content centric network, in accordance with an embodiment of the present invention.

FIG. 5 illustrates an exemplary computer and communication system that facilitates dynamically adjusting forwarding information in a content centric network, in accordance with an embodiment of the present invention. Computer and communication system 502 includes a processor 504, a memory 506, and a storage device 508. Memory 506 can include a volatile memory (e.g., RAM) that serves as a managed memory, and can be used to store one or more memory pools. Furthermore, computer and communication system 502 can be coupled to a display device 510, a keyboard 512, and a pointing device 514. Storage device 508 can store an operating system 516, a content-processing system 518, and data 528.

Content-processing system 518 can include instructions, which when executed by computer and communication system 502, can cause computer and communication system 502 to perform methods and/or processes described in this disclosure. Specifically, content-processing system 518 may include instructions for sending and/or receiving data packets to/from other network nodes across a computer network, such as a content centric network (communication module 520). A data packet can include an interest packet or a content object packet with a name which is an HSVLI that includes contiguous name components ordered from a most general level to a most specific level. A data packet can also include an interest return message, which indicates an error condition.

Specifically, content-processing system 518 may include instructions for receiving an interest with a name that is an HSVLI (communication module 520). Content-processing system 518 may include instructions for identifying in a first data structure an entry for one or more name components of the name, wherein the entry includes a list of outgoing interfaces associated with the one or more name components (FIB lookup module 522). Content-processing system 518 may also include instructions for determining network properties in response to forwarding the interest to a first interface of the list of outgoing interfaces (network property-determining module 524 and communication module 520). Content-processing system 518 may include instructions for reordering the list of outgoing interfaces in order of priority based on the network properties (interface-list managing module 526). Content-processing system 518 can further include instructions for selecting a second interface from the reordered list (interface list-managing module 526) and forwarding the interest to the second interface (communication module 520).

Content-processing system 518 can additionally include instructions for recording a round trip time that begins when the interest is forwarded to the first interface and ends when a responsive content object is received from the first interface (network property-determining module 524) and for reordering the list to indicate that a higher priority is based on a shorter round trip time for a respective interface (interface list-managing module 526).

Content-processing system 518 can include instructions for receiving from the first interface an interest return message which indicates an error condition (communication module 520) and for reordering the list to indicate that the first interface is of a lower priority than a second interface which has a recorded round trip time (interface list-managing module 526).

Content-processing system 518 may include instructions for, in response to detecting in a second data structure a timeout of an entry for the interest after forwarding the interest to the first interface (network property-determining module 524 and communication module 520), removing the first interface from the list or reordering the first interface to a lowest priority in the list (interface list-managing module 526).

Content-processing system 518 may also include instructions for calculating a weight for each outgoing interface based on the network properties (network property-determining module 524) and reordering the list to indicate that a higher priority is based on a greater calculated weight for a respective interface (interface list-managing module 526). Content-processing system 518 may include instructions for performing a function based on network properties determined over a period of time, wherein the period of time is a predetermined value or a user-defined value (network property-determining module 524).

Data 528 can include any data that is required as input or that is generated as output by the methods and/or processes described in this disclosure. Specifically, data 528 can store at least: an interest; a name for an interest that is an HSVLI which comprises contiguous name components ordered from a most general level to a most specific level; a name prefix which comprises one or more name contiguous name components from the most general level; a name prefix which comprises one or more name contiguous name components; a first data structure; a forwarding information base (FIB); an entry in the FIB; a FIB entry for a name prefix with a list of corresponding outgoing interfaces; an indicator of a round trip time that begins when the interest is forwarded to the first interface and ends when a responsive content object is received from the first interface; an indicator of receipt of an interest return message which indicates an error condition; an indicator of a timeout of an entry in a pending interest table, wherein the timeout indicates that a responsive content object to the interest has not been received before an expiration of the entry; a second data structure; a pending interest table (PIT); an entry in the PIT; a PIT entry for an interest name; a list of incoming interfaces from which the interest is received; a list of outgoing interfaces to which the interest is forwarded; an absolute or relative expiry time which indicates a lifetime for the entry in the pending interest table; a weight for a respective interface; network properties; and a relative or absolute priority for an interface on the list of outgoing interfaces.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system, the system comprising:
a processor;
a storage device coupled to the processor and storing instructions that when executed by a computer cause the computer to perform a method, the method comprising:
receiving, by forwarding circuitry, an interest with a name that is a hierarchically structured variable length identifier which comprises contiguous name components ordered from a most general level to a most specific level;
identifying in a first data structure an entry for one or more name components of the name, wherein the entry includes a list of outgoing interfaces associated with the one or more name components;
determining network properties in response to forwarding the interest to a first interface of the list of outgoing interfaces; and
reordering the list of outgoing interfaces in order of priority based on the network properties, thereby facilitating the forwarding circuitry to dynamically adjust a likelihood of using a respective interface for forwarding interests associated with the one or more name components.

2. The computer system of claim 1, wherein the method further comprises:
selecting a second interface from the reordered list; and
forwarding the interest to the second interface.

3. The computer system of claim 1, wherein determining the network properties further comprises:
recording a round trip time that begins when the interest is forwarded to the first interface and ends when a responsive content object is received from the first interface; and
wherein the method further comprises reordering the list to indicate that a higher priority is based on a shorter round trip time for a respective interface.

4. The computer system of claim 1, wherein determining the network properties further comprises:
receiving from the first interface an interest return message which indicates an error condition; and
wherein the method further comprises reordering the list to indicate that the first interface is of a lower priority than a second interface which has a recorded round trip time,
wherein a round trip time begins when the interest is forwarded to the second interface and ends when a responsive content object is received from the second interface.

5. The computer system of claim 1, wherein the first data structure is a forwarding information base, and wherein an entry in the forwarding information base further includes, for a respective interface of the list of outgoing interfaces, one or more of:
an indicator of a round trip time that begins when the interest is forwarded to the first interface and ends when a responsive content object is received from the first interface;
an indicator of receipt of an interest return message which indicates an error condition; and
an indicator of a timeout of an entry in a pending interest table, wherein the timeout indicates that a responsive content object to the interest has not been received before an expiration of the entry.

6. The computer system of claim 1, wherein the one or more name components comprise a name prefix, and wherein the one or more name components are contiguous name components beginning from the most general level.

7. The computer system of claim 1, wherein determining the network properties further comprises:
in response to detecting in a second data structure a timeout of an entry for the interest after forwarding the interest to the first interface:
removing the first interface from the list; or
reordering the first interface to a lowest priority in the list.

8. The computer system of claim 7, wherein the second data structure is a pending interest table, and wherein an entry in the pending interest table includes the interest name, a list of incoming interfaces from which the interest is received, a list of outgoing interfaces to which the interest is forwarded, and an expiry time which indicates a lifetime for the entry in the pending interest table.

9. The computer system of claim 1, wherein the method further comprises:
calculating a weight for each outgoing interface based on the network properties; and
reordering the list to indicate that a higher priority is based on a greater calculated weight for a respective interface.

10. The computer system of claim 9, wherein calculating the weight further comprises:
performing a function based on network properties determined over a period of time, wherein the period of time is a predetermined value or a user-defined value.

11. A computer-implemented method, comprising:
receiving, by forwarding circuitry, an interest with a name that is a hierarchically structured variable length identifier which comprises contiguous name components ordered from a most general level to a most specific level;
identifying in a first data structure an entry for one or more name components of the name, wherein the entry includes a list of outgoing interfaces associated with the one or more name components;
determining network properties in response to forwarding the interest to a first interface of the list of outgoing interfaces; and
reordering the list of outgoing interfaces in order of priority based on the network properties, thereby facilitating the forwarding circuitry to dynamically adjust a likelihood of using a respective interface for forwarding interests associated with the one or more name components.

12. The method of claim 11, further comprising:
selecting a second interface from the reordered list; and
forwarding the interest to the second interface.

13. The method of claim 11, wherein determining the network properties further comprises:
recording a round trip time that begins when the interest is forwarded to the first interface and ends when a responsive content object is received from the first interface; and
wherein the method further comprises reordering the list to indicate that a higher priority is based on a shorter round trip time for a respective interface.

14. The method of claim 11, wherein determining the network properties further comprises:
receiving from the first interface an interest return message which indicates an error condition; and
wherein the method further comprises reordering the list to indicate that the first interface is of a lower priority than a second interface which has a recorded round trip time,
wherein a round trip time begins when the interest is forwarded to the second interface and ends when a responsive content object is received from the second interface.

15. The method of claim 11, wherein the first data structure is a forwarding information base, and wherein an entry in the forwarding information base further includes, for a respective interface of the list of outgoing interfaces, one or more of:
an indicator of a round trip time that begins when the interest is forwarded to the first interface and ends when a responsive content object is received from the first interface;
an indicator of receipt of an interest return message which indicates an error condition; and
an indicator of a timeout of an entry in a pending interest table, wherein the timeout indicates that a responsive content object to the interest has not been received before an expiration of the entry.

16. The method of claim 11, wherein the one or more name components comprise a name prefix, and wherein the one or more name components are contiguous name components beginning from the most general level.

17. The method of claim 11, wherein determining the network properties further comprises:
in response to detecting in a second data structure a timeout of an entry for the interest after forwarding the interest to the first interface:
removing the first interface from the list; or
reordering the first interface to a lowest priority in the list.

18. The method of claim 17, wherein the second data structure is a pending interest table, and wherein an entry in the pending interest table includes the interest name, a list of incoming interfaces from which the interest is received, a list of outgoing interfaces to which the interest is forwarded, and an expiry time which indicates a lifetime for the entry in the pending interest table.

19. The method of claim 11, further comprising:
calculating a weight for each outgoing interface based on the network properties; and
reordering the list to indicate that a higher priority is based on a greater calculated weight for a respective interface.

20. The method of claim 19, wherein calculating the weight further comprises:
performing a function based on network properties determined over a period of time, wherein the period of time is a predetermined value or a user-defined value.

* * * * *